United States Patent [19]

Staub, Jr.

[11] 4,252,227
[45] Feb. 24, 1981

[54] TORSIONAL VIBRATION DAMPER AND CLUTCH ASSEMBLY

[75] Inventor: Vincent M. Staub, Jr., Dayton, Ohio

[73] Assignee: General Motors Corporation, Detroit, Mich.

[21] Appl. No.: 67,329

[22] Filed: Aug. 17, 1979

[51] Int. Cl.³ .............................................. F16D 3/14
[52] U.S. Cl. ................................ 192/106.1; 192/55; 74/411; 64/27 NM
[58] Field of Search ............... 192/106.1, 55, 3.28, 192/3.29; 74/411; 64/27 NM, 27 R

[56] References Cited

U.S. PATENT DOCUMENTS

| | | | |
|---|---|---|---|
| 3,039,578 | 6/1962 | Peras | 192/106.1 |
| 3,280,949 | 10/1966 | Ross | 192/106.1 X |
| 3,406,583 | 10/1968 | Baier | 74/411 |
| 3,811,545 | 5/1974 | Sato et al. | 192/106.1 |
| 4,138,003 | 2/1979 | Malloy | 192/106.1 X |

*Primary Examiner*—George H. Krizmanich
*Attorney, Agent, or Firm*—Donald F. Scherer

[57] ABSTRACT

A torsional vibration damper for a torque converter clutch has a plurality of elastomeric members disposed in drive relation between a clutch input member and a clutch output member. One end of the elastomeric members is pivotally connected to the clutch input and the other end of the elastomeric members is operatively connected to the output member through a cam surface. The elastomeric members, while transmitting torque, permit relative angular motion between the input and output members of the clutch to reduce the torsional vibrations imposed on the input member by an internal combustion engine.

3 Claims, 2 Drawing Figures

TORSIONAL VIBRATION DAMPER AND CLUTCH ASSEMBLY

This invention relates to torsional vibration dampers and more particularly to torsional vibration dampers incorporated in torque converter clutches and utilizing an elastomeric member to transmit torque.

It is an object of this invention to provide an improved torsional vibration damper for a clutch wherein a plurality of elastomeric band members extend radially between the input and output members of the clutch and in which said band members are operable to transmit torque while permitting relative angular motion.

It is another object of this invention to provide an improved torsional vibration damper for a torque converter clutch wherein the damper comprises a plurality of radially extending elastomeric band members pivotally connected to the clutch input member and drivingly connected to a clutch output member through a plurality of cam surfaces formed thereon.

Figure 1:
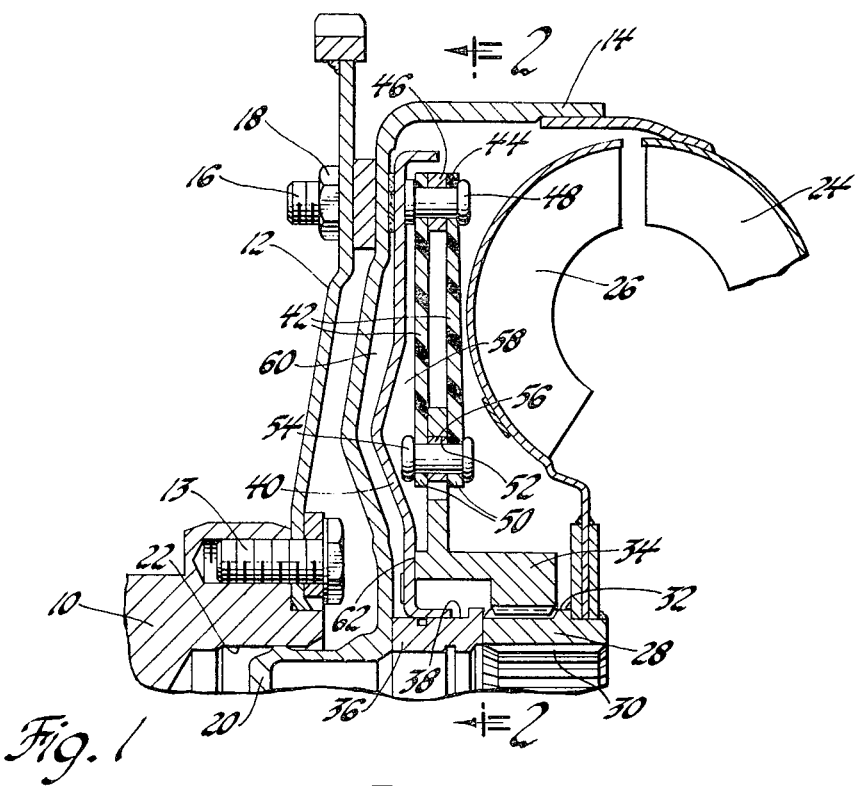
Figure 2:
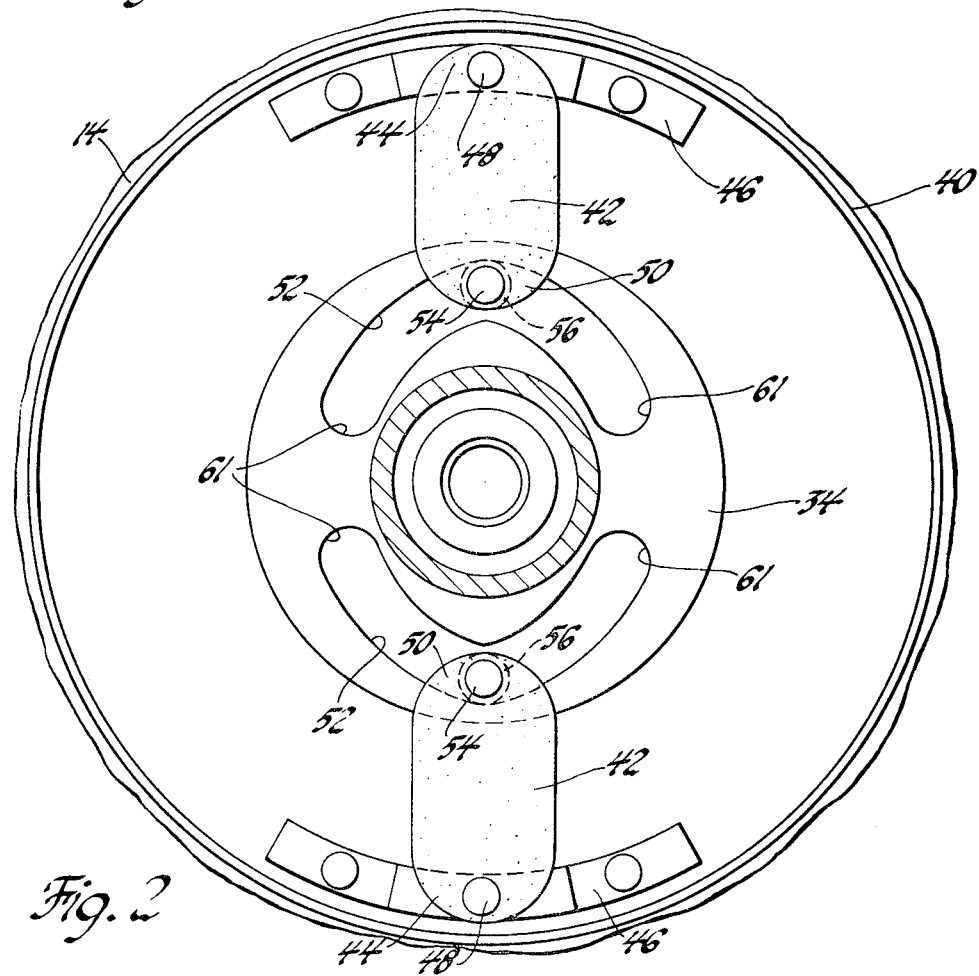

These and other objects and advantages of the present invention will be more apparent from the following description and drawings in which:

FIG. 1 is a cross-sectional side elevational view of a torque converter clutch and damper, and FIG. 2 is a view taken along line 2—2 of FIG. 1.

Referring to the drawings, there is seen a conventional engine crankshaft 10 to which is secured, by a plurality of fasteners 13, a conventional flex plate 12. The flex plate 12 is also secured to an input shell 14 through threaded lugs 16 formed on the shell 14 and fasteners 18 which are threadably secured to the lugs 16. The input shell 14 has a central hub portion 20 which is piloted in a bore 22 formed in the crankshaft 10. The input shell 14 forms a portion of a conventional fluid torque converter partially shown in FIG. 1 in the form of an impeller 24 secured to the input shell 14 and a turbine 26.

The turbine 26 has a hub 28 having an inner splined diameter 30 and an outer splined diameter 32 adapted to be connected to a transmission input shaft, not shown, and a clutch output hub 34, respectively. The hub 28 is spaced from the input shell 14 by a conventional spacer member 36 which has an outer diamter 38 on which is slidably disposed a clutch plate 40.

The clutch plate 40 is connected to the clutch output hub 34 by a plurality of identical elastomeric band members 42 which are preferably mounted in pairs, as seen in FIG. 1. The bands 42 are pivotally connected at their outer end 44 to a steel band 46 by rivets 48. The steel band 46 is riveted or otherwise secured to the clutch plate 40. The inner end 50 of the elastomeric bands 42 are operatively connected to a cam surface 52, formed on the output hub 34, through a pin 54 and a roller 56.

The clutch plate 40, which forms an input member for the clutch and torsional vibration mechanism comprised of the elastomeric bands 42, is selectively engageable with the input shell 14 by controlling fluid pressure in the area 58 formed between the clutch plate 40 and the turbine 26 and the area 60 formed between the clutch plate 40 and input shell 14. Generally, the fluid pressure in these areas is controlled by reversal of the fluid through the torque converter which can be accomplished in many ways including that shown in U.S. Pat. No. 3,252,352 issued to General et al. When the clutch plate 40 is engaged with the input shell 14, torque is transmitted to the turbine hub 28 through the elastomeric bands 42 and the clutch output hub 34. As the amount of torque transmitted increases, the clutch plate 40 will move angularly relative to the output hub 34 and the inner end 50 of elastomeric bands 42 will move along the cam surface 52 thereby increasing the length of the elastomeric bands 42 to accommodate the increased stress level required by the increased torque transmission and the angular excursion of the clutch plate 40 relative to the output hub 34. Because of the flexibility and resiliency of the elastomeric bands 42, rapid torsional fluctuations commonly accompanying an internal combustion engine will be dampened. The stress in bands 42 will rise slowly while the rollers 56 traverse the cam surface 52. However, when the rollers 56 abut the ends 61 of cam surfaces 52, the stress in bands 42 will rise more rapidly.

The cam surface 52 permits relative rotation in both directions from the "at rest" position shown in FIG. 2. This permits the damper to accommodate torsional vibrations which might occur both when the engine is driving the vehicle and when the vehicle is coasting and thereby driving the engine. It will be obvious that mechanical stops can be incorporated in the system to limit the maximum angular excursion permitted between the input and output members of the clutch. It will also be obvious to those skilled in the art that frictional damping can be incorporated at surface 62 where the clutch plate 40 and output clutch hub 34 are in abutting relationship. While a total of four elastomeric bands 42 are shown, it is obvious that more bands could be incorporated in the system if desirable to reduce the stress level which might occur in a single band or to increase the overall total capacity of the vibration damper.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A single plate clutch and torsional vibration damper comprising; input means for accepting an input drive torque; output means for delivering a drive torque and having a plurality of cam reaction surfaces formed therein; and vibration damper means including a plurality of radially extending elastomeric band means each having one end pivotally connected to said input means and being rotatable therewith and another end drivingly connected to respective cam reaction surfaces on said output means for transmitting torque between the input means and the output means while said band means change length permitting relative angular movement between said input means and said output means.

2. A single plate clutch and torsional vibration damper comprising; input drive transmitting means for accepting an input drive torque; output drive transmitting means for delivering a drive torque; a plurality of cam reaction surfaces formed on one of said drive transmitting means; and vibration damper means including a plurality of radially extending elastomeric band means each having one end pivotally connected to the other of said drive transmitting means and being rotatable therewith and another end drivingly connected to respective cam reaction surfaces on said one drive transmitting means for transmitting torque between the input drive transmitting means and the output drive transmitting means while said band means change length permitting relative angular movement between said input drive transmitting means and said output drive transmitting means.

3. A single plate clutch and torsional vibration damper comprising; input means for accepting an input drive torque; output means for delivering a drive torque and having a plurality of cam reaction surfaces formed therein; and vibration damper means including a plurality of elastomeric band means extending radially between said input means and said output means, each band having one end drivingly connected to said input means and another end drivingly connected to respective cam reaction surfaces on said output means for transmitting torque between the input means and the output means while said band means change length accommodating relative angular movement between said input means and said output means thereby decreasing the torsional vibrations transmitted therebetween.

* * * * *